(12) United States Patent
Matsubara et al.

(10) Patent No.: US 8,773,822 B2
(45) Date of Patent: Jul. 8, 2014

(54) SPIN-TORQUE OSCILLATOR FOR MICROWAVE ASSISTED MAGNETIC RECORDING

(75) Inventors: Masato Matsubara, Yokohama (JP); Masato Shiimoto, Odawara (JP); Hiroyuki Katada, Odawara (JP); Keiichi Nagasaka, Isehara (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 13/296,866

(22) Filed: Nov. 15, 2011

(65) Prior Publication Data

US 2012/0120518 A1    May 17, 2012

(30) Foreign Application Priority Data

Nov. 16, 2010    (JP) .................................. 2010-255700

(51) Int. Cl.
*G11B 5/33*    (2006.01)
(52) U.S. Cl.
USPC ......................................................... 360/326
(58) Field of Classification Search
None
See application file for complete search history.

(56) References Cited

U.S. PATENT DOCUMENTS

| 8,027,110 | B1* | 9/2011 | Yamanaka et al. | 360/31 |
| 2001/0015871 | A1 | 8/2001 | Niwa | |
| 2003/0161080 | A1 | 8/2003 | Ishikawa et al. | |
| 2008/0268291 | A1* | 10/2008 | Akiyama et al. | 428/812 |
| 2008/0304176 | A1 | 12/2008 | Takagishi et al. | |

FOREIGN PATENT DOCUMENTS

| JP | 06-243527 | 9/1994 |
| JP | 08-007223 | 1/1996 |
| JP | 2001-236609 A | 8/2001 |
| JP | 2003-249700 A | 5/2003 |
| JP | 2009-163871 A | 7/2009 |

OTHER PUBLICATIONS

Zhu, Xiaochun, et al.; Bias-Field-Free Microwave Oscillator Driven by Perpendicularly Polarized Spin Current; IEEE Transactions on Magnetics, vol. 42, No. 10, Oct. 2006; pp. 2670-2672.
Zhu, Jian-Gang, et al.; Microwave Assisted Magnetic Recording; IEEE Transactions on Magnetics, vol. 44, No. 1, Jan. 2008; pp. 125-131.
Wang, Yiming, et al.; Media damping constant and performance characteristics in microwave assisted magnetic recording with circular ac field; Journal of Applied Physics 105, 07B902 (2009); pp. 1-3.
Japan Patent Office Notification of Reasons for Refusal on application 2010-255700 mailed Jul. 30, 2013; pp. 1-3.

* cited by examiner

*Primary Examiner* — David D Davis
(74) *Attorney, Agent, or Firm* — Foley & Lardner LLP

(57) ABSTRACT

In a conventional type magnetic head that performs microwave assisted recording, since a difference in a demagnetizing field between an end and the center of a field generation layer (FGL) grows larger when saturation magnetization of the FGL grows larger, the FGL that generates a microwave is not oscillated in a state of a single domain. Then, a spin-torque oscillator according to the present invention used for a magnetic head for microwave assisted recording is provided with at least one fixed layer, one non-magnetic intermediate layer and one alternating-current magnetic field generation layer respectively and is provided with a structure where saturation magnetization at ends of a film except an end in a direction from an air bearing surface to a surface opposite to it is made smaller than saturation magnetization in the center of the film of the alternating-current magnetic field generation layer.

17 Claims, 9 Drawing Sheets

|  | CONVENTIONAL TYPE STRUCTURE | STRUCTURE A | STRUCTURE B |
|---|---|---|---|
| Ms_in (T) | 2.4 | 2.4 | 2.4 |
| Ms_out (T) | 2.4 | 1.2 | 1.0 |
| S_in (nm^2) | 40×40 | 800 | 1120 |
| S_out (nm^2) | 0 | 800 | 480 |
| Ratio | 0 | 0.5 | 0.25 |
| SDR | 0.55 | 0.95 | 0.85 |
| Hac (kOe) | 1.3 | 1.7 | 1.6 |

SPIN-TORQUE OSCILLATOR FOR MICROWAVE ASSISTED MAGNETIC RECORDING

INCORPORATION BY REFERENCE

The present application claims priority from Japanese application serial No. 2010-255700, filed on Nov. 16, 2010, the entire contents of which are hereby incorporated by reference into this application.

FIELD OF THE INVENTION

The present invention relates to a structure for stably oscillating a field generation layer (FGL) in a magnetic head for microwave assisted recording in a state of a single domain.

BACKGROUND OF THE INVENTION

The miniaturization of the bit size of a record medium is promoted according to the enhancement of the recording density of a hard disk drive (HDD). However, as the miniaturization of the bit size is advanced, the extinction by thermal fluctuation of a recorded state is feared. To settle such a problem and to stably maintain a bit in future high density recording, it is required to use a record medium the coercive force of which is large (that is, the magnetic anisotropy of which is large). However, a strong recording magnetic field is required to record on the record medium the coercive force of which is large. Actually, the enhancement of the strength of the recording magnetic field is limited because of narrowing the width of a recording head and the limitation of available magnetic materials. For such a reason, the coercive force of the record medium is limited by the dimension of a recording magnetic field that can be generated by the recording head. As described above, to correspond to incompatible requests for the high thermal stability of the medium and the coercive force that is easy to record, a recording method of effectively reducing the coercive force of a record medium only in recording using various auxiliary means is devised and heat-assisted recording in which recording is made using a magnetic head and heating means such as a laser together is its representative.

In the meantime, a method of locally reducing the coercive force of a record medium by using a recording magnetic field from a recording head and a high-frequency field together and recording also exists. For example, JP-A No. 1994-243527 discloses technique for recording information by heating a magnetic record medium by Joule heating or magnetic resonance by a high-frequency field and locally reducing the coercive force of the medium. In such a recording method (hereinafter called microwave assisted recording) of utilizing magnetic resonance between a high-frequency field and a magnetic field applied by a magnetic head, a large high-frequency field proportional to an anisotropy field of a medium is required to be applied so as to acquire the effect of reducing an inverted magnetic field because magnetic resonance is utilized.

Recently, a principle for generating a high-frequency field using spin torque as in a spin-torque oscillator is proposed and the possibility of microwave assisted recording is being realized. For example, "Bias-Field-Free Microwave Oscillator Driven by Perpendicularly Polarized Spin Current" written by X. Zhu and J. G. Zhu, IEEE TRANSACTIONS ON MAGNETICS, P2670, VOL. 42, NO. 10 (2006) discloses results of the calculation of a spin-torque oscillator that oscillates without a biased magnetic field from an external device. Further, in "Microwave Assisted Magnetic Recording" written by J. G. Zhu and X. Zhu, the Magnetic Recording Conference (TMRC) 2007 Paper B6 (2007) discloses technique for recording information on a magnetic record medium the magnetic anisotropy of which is large by arranging a field generation layer (FGL) the magnetization in which is spun at high speed by spin torque next to a main pole of a perpendicular magnetic head and in the vicinity of the magnetic record medium and generating a microwave (a high-frequency field). Further, "Microwave Assisted Magnetic Recording with Circular AC Field Generated by Spin Torque Transfer" written by J. Zhu and Y. Wang, MMM Conference 2008 Paper GA-02 (2008) presents a spin-torque oscillator that controls a rotation direction of FGL utilizing a magnetic field of a main pole close to the FGL and it is described that hereby, microwave assisted magnetic reversal of a medium can be efficiently realized.

SUMMARY OF THE INVENTION

A characteristic required for FGL configuring a spin-torque oscillator for microwave assisted recording is to stably oscillator large high-frequency field strength.

To increase the strength of a high-frequency field generated by FGL, it is required to use materials the saturation magnetization of which is large for FGL.

A stable oscillatory state means that magnetization in FGL is spun in the same direction when it is spun by spin torque, that is, is oscillated in a state of a single domain. When oscillation is unstable and magnetization spin is not uniform in the same direction, that is, in a case of a state of multiple magnetic domains, a spun state of magnetization may not be fixed for time. In this case, magnetic field strength generated from FGL is not fixed for time and a problem that recording cannot be sufficiently assisted occurs. Or in the case of the state of multiple magnetic domains, magnetization forms a closure domain in FGL. In this case, the magnetization shows a fixed spun state for time. However, since the magnetization returns in FGL, a sufficient magnetic field cannot be generated from FGL to the outside, and a problem arises that recording cannot be assisted. As described above, it is an essential condition in microwave assisted recording that FGL is oscillated in a state of a single domain.

A cause in which FGL is not oscillated in a state of a single domain is from difference in the dimension of a demagnetizing field between an end and the center of the FGL. At the end of the FGL, a large demagnetizing field is caused in a boundary between the inside and the outside of the FGL. The demagnetizing field means a magnetic field caused toward the inside in a direction reverse to the magnetization of the inside by plane magnetization that turns up in the boundary between the inside and the outside of the FGL. The dimension of the plane magnetization is determined corresponding to the difference between two dimensions of magnetization having the boundary between them. Besides, the demagnetizing field is larger in a location close to the plane magnetization, that is, the boundary and demagnetizes the magnetization of the inside. The demagnetizing field becomes smaller as an interval of the plane magnetization, that is, the boundary is increased. As a result, the difference with the dimension of a demagnetizing field in the center of the FGL is increased. That is, a large difference is made between the dimension of a magnetic field sensed by magnetization at the end of the FGL and the dimension of a magnetic field sensed by magnetization in the center of the FGL. As a result, the magnetization at the end of the FGL and the magnetization in the center of the FGL are not spun with both magnetizations synchronous in the same direction. That is, the FGL is not oscillated in a state of a single domain. As the dimension of the demagnetizing field is proportional to the dimension of the saturation magnetization of the FGL, the dimension of the demagnetizing field can be reduced if a material with low saturation magnetization is used for the FGL. However, since magnetic field strength generated from the FGL decreases when the material the saturation magnetization of which is small is used, it is not desirable from a viewpoint of assisted recording.

As described above, in microwave assisted recording, it is a large objective to stably oscillate the FGL in a state of a single domain by providing a structure that enables reducing a demagnetizing field which reduces the dimension of saturation magnetization.

To achieve the objective, the following means are used in the present invention. FGL in a spin-torque oscillator having a conventional type structure is provided with even saturation magnetization in a plane of a film. In the meantime, in the present invention, a film where saturation magnetization at an end in an in-plane direction is reduced, compared with that in the center is used for FGL in a spin-torque oscillator. As the dimension of a demagnetizing field is proportional to the dimension of saturation magnetization, a demagnetizing field at the end of the FGL with reduction of the dimension of saturation magnetization at the end is reduced. As a result, the difference between the dimensions of a demagnetizing field at the end and in the center of the FGL decreases and the magnetization of the FGL is easily oscillated in a state in which the magnetization is synchronously spun, that is, in a state of a single domain.

At this time, it is desirable that saturation magnetization at the end along an opposite face to a medium of the FGL is similar to saturation magnetization in the center. The reason is that when the quantity of magnetization at the end along the opposite face to the medium decreases, assisted magnetic field strength applied to the medium can be increased.

In the structure according to the present invention, as saturation magnetization is reduced or as a region where saturation magnetization is reduced is extended, it is easier to turn to a signal magnetic domain and magnetization is spun simultaneously. However, as the saturation magnetization is reduced or as the region where the saturation magnetization is reduced is extended, the quantity of the magnetization of the whole FGL decreases and assisted magnetic field strength applied to the medium decreases. Accordingly, an optimum range exists in quantity in which the saturation magnetization at the end of the FGL is reduced and in the region where the saturation magnetization is reduced.

The reduced quantity of saturation magnetization at an end in a direction of track width of the FGL and at an end in a direction of the height of the oscillator is required to be controlled depending upon the ratio of the length in the direction of track width of the FGL to the height of the oscillator. For example, when the height of the oscillator is larger than the length in the direction of track width, the dimension of a demagnetizing field at the end in the direction of track width of the FGL is larger, compared with that at the end in the direction of the height of the oscillator. Accordingly, the reduced quantity of saturation magnetization at the end in the direction of track width is required to be made larger than the reduced quantity at the end in the direction of the height of the oscillator. The ratio of the optimum reduced quantity of saturation magnetization at the end in the direction of the height of the oscillator to the optimum reduced quantity at the end of the direction of track width is substantially coincident with inverse numbers of the height of the oscillator and the length in the direction of track width.

Since a demagnetizing field that reduces the dimension of saturation magnetization can be reduced when the structure according to the present invention is used, large assisted magnetic field strength and stable oscillation are acquired.

According to the present invention, stable oscillation can be realized and the reliable spin-torque oscillator can be provided.

DETAILED DESCRIPTION OF THE PREFERRED EMBODIMENTS

Figure 1:
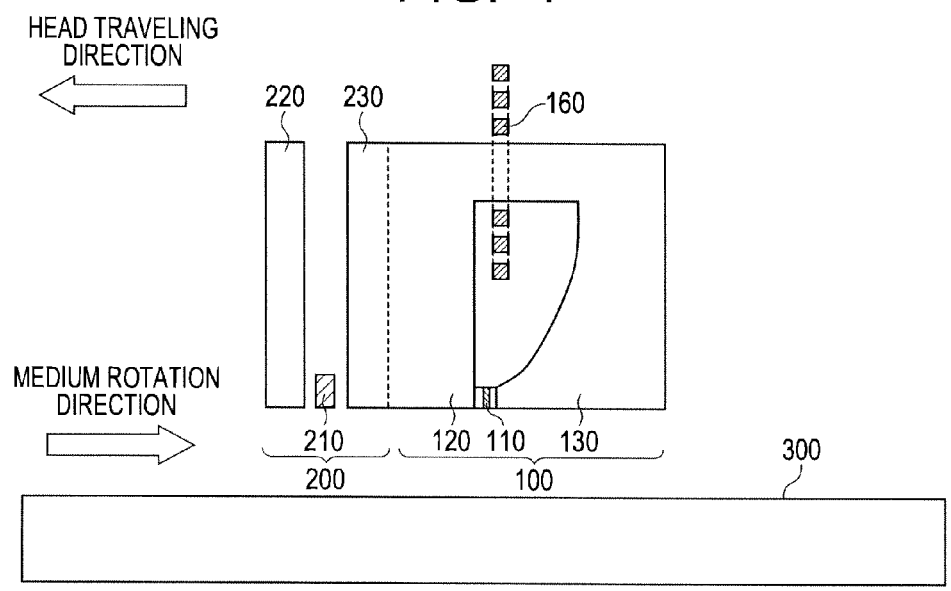
FIG. 1 is a schematic diagram showing a magnetic recording/reproducing head provided with an oscillator according to the present invention.

Referring to the drawings, embodiments of the present invention will be described below. To facilitate the understanding, the same reference numeral is allocated to the same functional part in the following drawings.

First Embodiment

FIG. 1 is a schematic diagram showing a magnetic recording/reproducing head provided with an oscillator according to the present invention in a disk unit including the magnetic recording/reproducing head that records and reproduces data and a magnetic record medium 300 on which the recording and the reproduction of data are performed by the magnetic recording/reproducing head.

The magnetic recording/reproducing head shown in FIG. 1 is configured by a recording head part 100 and a reproducing head part 200. The recording head part 100 is configured by the oscillator 110 for generating a high-frequency field, a main pole 120 for generating a recording head magnetic field and a coil 160 for magnetizing the main pole. Further, a trailing shield 130 can be provided in a trailing direction of the main pole. In this case, the trailing direction is defined as a direction reverse to a traveling direction of the head over the medium and a leading direction is defined as the traveling direction of the head over the medium. Though it is not shown in FIG. 1, a side shield may also be provided outside the main pole 120 in a direction of track width (a direction perpendicular to a paper face). In this configuration, the reproducing head part 200 is arranged at the head and the recording head part 100 is arranged at the back when the magnetic recording/reproducing head opposite to the magnetic record medium 300 is viewed from its traveling direction. However, when the head is viewed from the traveling direction, the arrangement may also be reversed as in an example that the recording head part 100 is arranged at the head and the reproducing head part 200 is arranged at the back.

The reproducing head part 200 is configured by a reproduction sensor 210, a lower magnetic shield 220 and an upper magnetic shield 230. As for the reproduction sensor 210, if only it fills the role of reproducing recorded signals, no special limitation is required. The reproduction sensor 210 may also be a reproduction sensor provided with so-called giant magneto-resistive (GMR) effect, may also be a reproduction sensor provided with tunneling magneto-resistive (TMR) effect or may also be a reproduction sensor provided with electromechanical resonant (EMR) effect. Further, it is desirable that the lower magnetic shield 220 and the upper magnetic shield 230 are provided because they fill an important role of enhancing the quality of reproduced signals.

Figure 2:
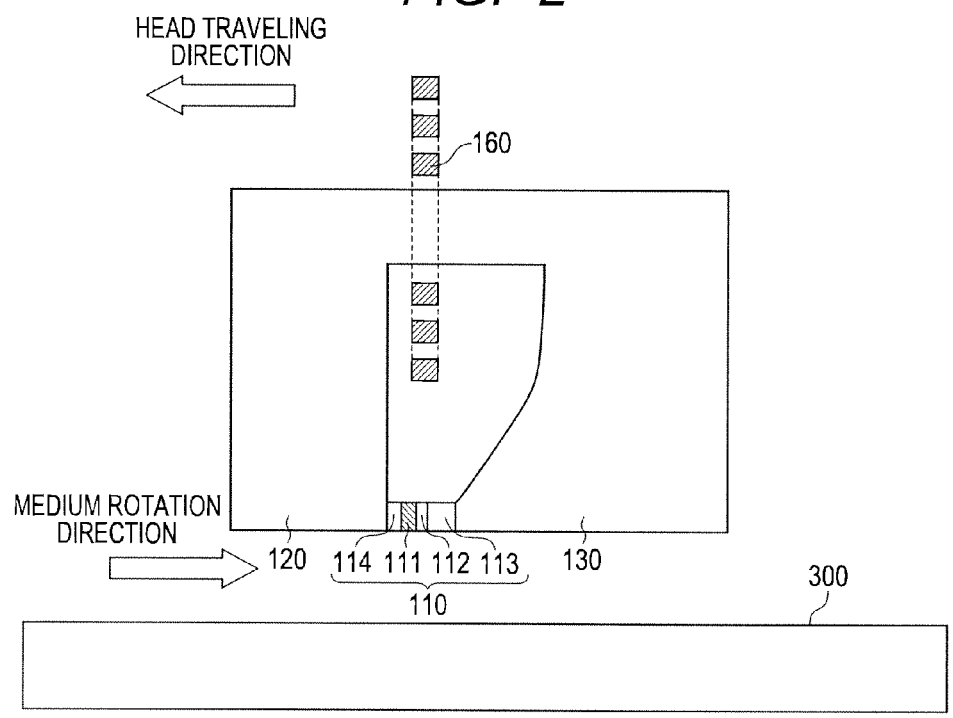
FIG. 2 shows an example of the detailed configuration of a recording head part 100 and the oscillator 110 which is a part of the recording head part 100.

FIG. 2 shows an example of the detailed configuration of the recording head part 100 in this configuration and the oscillator 110 which is a part of the recording head part. A recording layer of the perpendicular record medium 300 shown in FIG. 2 is magnetized in a direction perpendicular to an air bearing surface (ABS). The magnetic record medium 300 is generally configured by a protective coat, a recording layer, a soft magnetic bed and others. It is desirable, however, that a frequency of precession for magnetizing the recording layer is substantially coincident with the oscillation frequency of a high-frequency field of the oscillator 110. The magnetic record medium 300 may also be a so-called continuous medium on which each bit continuously exists and may also be a so-called discrete track medium on which a non-magnetic area where writing by the recording head is impossible is provided between plural tracks. Further, the magnetic record medium may also be a so-called patterned medium including non-magnetic material that fills a concave portion between convex magnetic patterns on a substrate.

The oscillator 110 of the recording head part 100 is configured by FGL 111 that generates a high-frequency field, an intermediate layer 112 made of material the transmissivity of spin in which is high, a spin transfer fixed layer 113 for applying spin torque to the FGL 111 and a spin guidance layer 114 for stabilizing spin for magnetizing the FGL. The configuration of the oscillator 110 may also be laminated in the order of the spin guidance layer 114, the FGL 111, the intermediate layer 112 and the spin transfer fixed layer 113 as shown in FIG. 2 from the side of the main pole and reversely, may also be laminated in the order of the spin transfer fixed layer 113, the intermediate layer 112, the FGL 111 and the spin guidance layer 114 from the side of the main pole. Although a lower limit of the total thickness of the oscillator 110 is not particularly specified, an upper limit is set to approximately 200 nm. This is because the distance between the main pole 120 and the shield 130 is too wide when the total thickness of the oscillator 110 is too thick, the attenuation of a magnetic field from the main pole 120 applied to the oscillator 110 increases and the high-frequency oscillation of the FGL 111 cannot last. Further, when the above-mentioned distance is too wide, a part in which a magnetic field is applied on the perpendicular record medium 300 and a part in which a microwave from the FGL is applied are apart and microwave assisted storage is not suitably performed.

The intermediate layer 112 in this configuration is made of Cu and the thickness is 2 nm. It is desirable that the intermediate layer 112 is made of non-magnetic conductive material and for example, Au, Ag, Pt, Ta, Ir, Al, Si, Ge and Ti can be used. The spin transfer fixed layer 113 in this configuration is made of Co/Pt and the thickness is 10 nm. Further, the anisotropy field Hk of Co/Pt used in this configuration is 8 kOe. The oscillation of the FGL 111 can be stabilized by using material having perpendicular anisotropy for the spin transfer fixed layer 113 and it is desirable that in addition to Co/Pt, artificial magnetic material such as Co/Ni, Co/Pd and CoCrTa/Pd is used. Moreover, though the stability of oscillation is slightly lost, the similar material to the FGL 111 can also be used. The spin guidance layer 114 in this configuration is made of Co/Ni having perpendicular anisotropic energy and the thickness is 10 nm. In addition, the anisotropy field Hk of Co/Ni in this configuration is 5 kOe. It is desirable that the similar material to the spin transfer fixed layer 113 is also used for the spin guidance layer 114. A high-frequency field can be applied by the above-mentioned configuration of the oscillator 110.

It is desirable for the configuration of the main pole 120 and the shield 130 in this configuration that material such as an alloy of Co and Fe which has large saturation magnetization and hardly has crystal magnetic anisotropy is used.

The configuration of the FGL using a film the saturation magnetization at its end of which is made lower than the saturation magnetization of its central part, which is a maximum characteristic of the structure according to the present invention and effect acquired by the configuration will be described in detail below.

Figure 3:
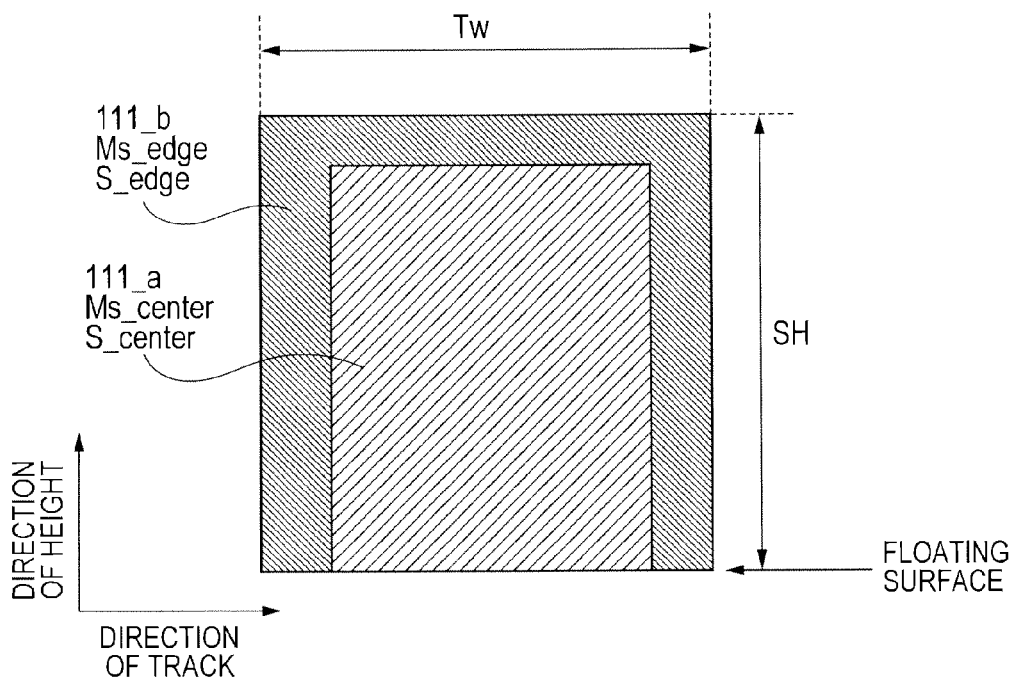
FIG. 3 shows the in-plane configuration of a film of FGL 111.

FIG. 3 shows the in-plane configuration of the film of the FGL 111 which is the structure according to the present invention. "FGL111_a" which is the center of the film of the FGL 111 is expressed as "FGL_center" and "FGL111_b" which is a region at each end except an end on the side of the air bearing surface in a direction of the height of the oscillator is expressed as "FGL_edge". Further, the saturation magnetization of FGL_center is expressed as "Ms_center", the area of the region is expressed as "S_center", the saturation magnetization of FGL_edge is expressed as "Ms_edge", and the area of the region is expressed as "S_edge". In the present invention, in FGL 111, Ms_edge is made smaller than Ms_center. It is a maximum characteristic of the present invention that the in-plane saturation magnetization of the film is unevenly distributed. Hereby, the difference in a demagnetizing field between FGL_edge that is the end of the FGL 111 and FGL_center that is the center, which is a maximum factor in which the FGL 111 of the oscillator 110 includes multiple magnetic domains, can be reduced, and oscillation in the single domain is facilitated. As a result, in the structure according to the present invention, the realization of high high-frequency field strength is facilitated.

The dimension of plane magnetization caused in a peripheral part of the FGL, that is, the dimension of a demagnetizing field is turned smaller than that in a case that the FGL 111 is magnetized with saturation magnetization of an even dimension (Ms_center) by reducing the dimension (Ms_edge) of the saturation magnetization of the peripheral part, compared with the dimension (Ms_center) of the saturation magnetization of the inside as shown in FIG. 3. The dimension of the saturation magnetization of the peripheral part of the FGL 111 shown in FIG. 3 is smaller than the difference between the dimensions (the saturation magnetization of the outside is substantially zero) of the saturation magnetization of the inside and the outside of the FGL 111 when the FGL 111 is magnetized with the saturation magnetization of the even dimension (Ms_center). That is, the present invention is characterized in that the structure is provided in which the dimension of plane magnetization caused in a boundary between regions is inhibited and a demagnetizing field is reduced by dividing the FGL 111 into regions different in the dimension of saturation magnetization and gradually varying the difference in the dimension of saturation magnetization with the outside.

"FGL_center" of the FGL 111 in this configuration is made of Fe and Co, the ratio of Fe to Co is 70:30, and "Ms_center" is set to 2.4 T. To realize high high-frequency field strength, it is desirable that material having high saturation magnetization is used for the material of FGL_center. Further, as the difference in a demagnetizing field between FGL_center and FGL_edge when FGL_center is made of material the saturation magnetization of which is large also increases, the effect of the present invention is also remarkable, though the effect is acquired even if any material is used. For example, for the material of the FGL 111, in addition to the alloy of Fe and Co, an alloy of Ni and Fe, Heusler alloy such as CoFeGe, CoMnGe, CoFeAl, CoFeSi, CoMnSi and CoFeSi, a Re—Tm amorphous alloy such as TbFeCo and an alloy of Co and Cr may also be used. Further, a material having negative perpendicular anisotropic energy such as CoIr may also be used. The thickness of the FGL 111 is set to 17 nm, the width Tw in a direction of track width of the FGL 111 is set to 40 nm, and the height SH in a direction of the height of the oscillator is set to 40 nm. As for the thickness of the FGL 111, the acquired maximum high-frequency field strength is also enhanced in a case of the thick FGL 111 as in the case of saturation magnetization, but the difference in a demagnetizing field between FGL_center and FGL_edge increases. In the structure according to the present invention, since the difference in a demagnetizing field between FGL_center and FGL_edge can be reduced, it is desirable that the FGL 111 is thick from a viewpoint of the realization of high high-frequency field strength. However, it is suitable that the thickness of the FGL 111 is set to approximately 100 nm or less. The reason is that when the FGL 111 is made as thick as approximately 100 nm or more, the magnetic field strength applied on the trailing side of the FGL 111 from the main pole 120 decreases, oscillated frequencies greatly decrease and microwave assisted effect remarkably decreases. A magnetic field applied to the FGL 111 is a magnetic field generated by writing current flowing in the coil 160 of the recording head part 100 and an oscillation frequency is determined by angular velocity in Larmor precession in the magnetic field.

Further, a detailed condition for stably acquiring the effect of the present invention will be described. Concretely, in the FGL 111, S_center, Ms_center, S_edge and FGL_edge are set so that they have the relation of $\{0.05<(Ms\_center-Ms\_edge)/Ms\_center\times(S\_edge/S\_center)<1\}$—Expression (1). Hereinafter, for simplification, $\{(Ms\_center-Ms\_edge)/Ms\_center\times(S\_edge/S\_center)\}$ is expressed as a rate of area magnetization.

Figure 4:
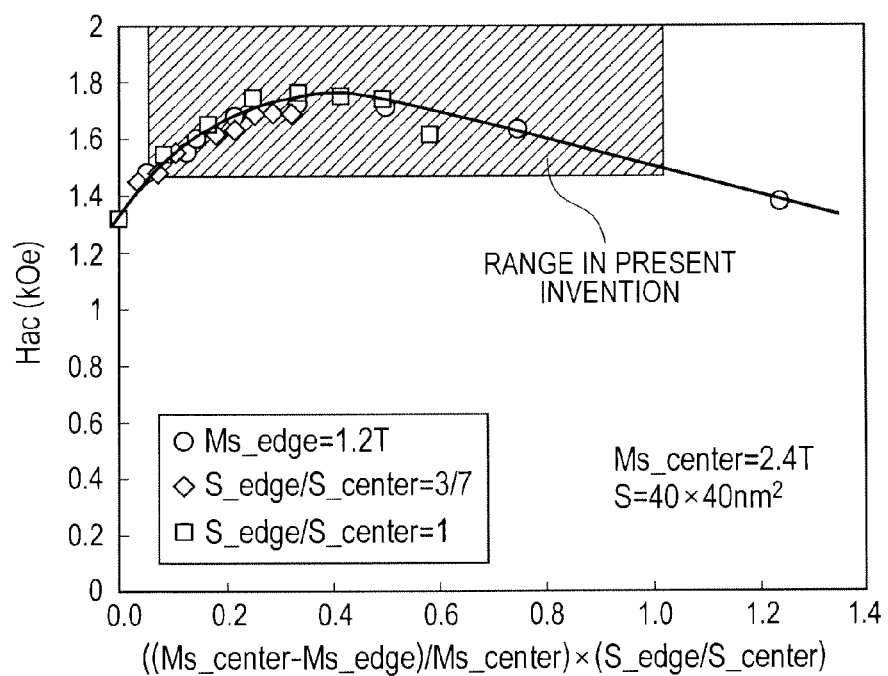
FIG. 4 shows relation between high-frequency field strength Mac and a rate of area magnetization acquired by the configuration according to the present invention.

FIG. 4 shows relation between high-frequency field strength Hac and a rate of area magnetization acquired by the configuration according to the present invention. For the high-frequency field strength, the dimension actually applied to the magnetic record medium 300 is supposed and is defined as the dimension in a position of 10 nm on the side of the medium in the direction of the height of the oscillator from the air bearing surface of the FGL 111. When the rate of area magnetization is close to zero, it means that magnetization Ms_edge at the end is equal to that in the center or that a rate of the area S_edge of a region where the magnetization at the end that accounts for the whole film is reduced is zero or very close to zero. That is, the configuration is similar to that of the conventional type structure that in-plane saturation magnetization in the film is even. In the meantime, when a rate of area magnetization is very large, it means that a rate of the area S_edge of a region where magnetization at the end which accounts for the whole film is reduced is large and almost means that Ms of the FGL 111 is substantially evenly reduced. When a rate of area magnetization is close to zero or is 1 or more, high-frequency field strength is approximately 1.3 kOe. However, it can be enhanced up to approximately 1.7 kOe by suitably controlling a rate of area magnetization.

Accordingly, as clear from the dependence of high-frequency field strength to a rate of area magnetization shown in FIG. 4, a suitable range in which the effect of enhancing high-frequency field strength is acquired exists as to a rate of area magnetization. The suitable range of the rate of area magnetization means a range in which the effect of enhancing high-frequency field strength by the control of the rate of area magnetization is 15% or more. The range is a region by an oblique line in FIG. 4 and there, high-frequency field strength is 1.5 kOe or more. This is the range expressed by the expression (1). The optimum range of the rate of area magnetization expressed in the expression (1) according to the present invention is unchanged in a case that either of Ms_edge or S_edge or both vary.

FIG. 4 shows a case that a rate of area magnetization varies by fixing M_edge to 1.2 T and varying S_edge/S_center and a case that a rate of area magnetization varies by fixing S_edge/S_center to 1 or $3/7$ and varying Ms_edge from 2.4 T to 0.0 T, and hereby, it can be verified that even if either of Ms_edge or S_edge is varied, the optimum range of the rate of area magnetization does not vary.

Figure 5:
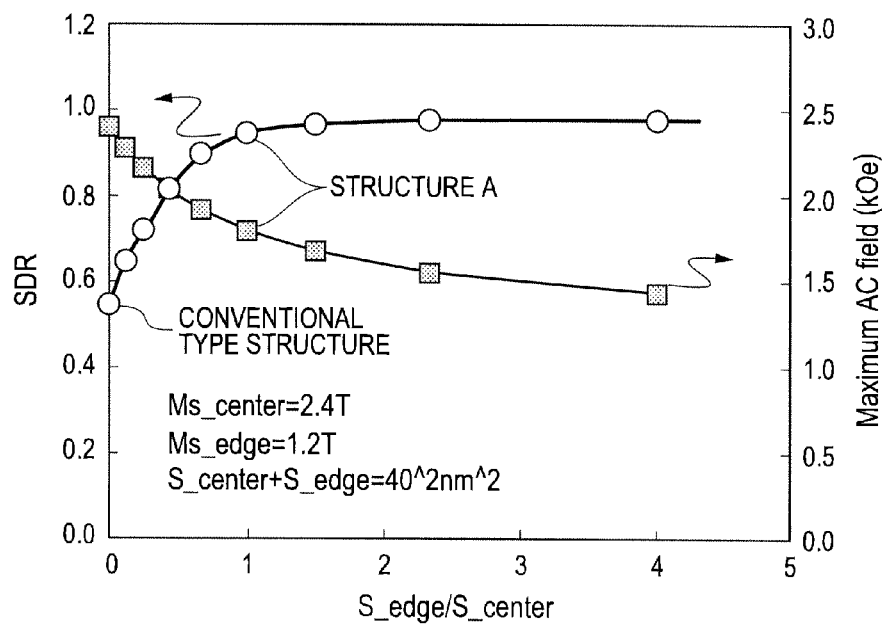
FIG. 5 shows a rate of a single domain of the FGL 111 when M_edge is fixed to 1.2 T and S_edge/S_center is varied and the dependence of maximum high-frequency field strength when the FGL is completely turned to a state of a single domain to S_edge/S_center.

A reason why the optimum range in which high-frequency field strength is maximum exists as to the rate of area magnetization and a reason why the optimum range does not vary will be described below. FIG. 5 shows the single domain ratio (SDR) of the FGL 111 when M_edge is fixed to 1.2 T and S_edge/S_center is varied and the dependence of maximum high-frequency field strength which is magnetic field strength acquired when the FGL is completely turned to a single domain to S_edge/S_center. The high-frequency field strength shown in FIG. 4 is equal to a product of the dimension of the saturation magnetization of the whole FGL and SDR. S_edge/S_center is varied so that the sum is continuously fixed. The reason is that the track width and the height of the FGL 111 are both 40 nm and the area is continuously 40×40 nm². The single domain ratio (SDR) is an index for measuring a degree of turning the FGL a single domain, in a state of a single domain in which when magnetization is completely directed in the same direction, the SDR is 1 and in the meantime, when magnetization is directed completely at random, the SDR is zero.

The SDR is defined by the following expression.

$$SDR=\{(\Sigma Mx/nMs)^2+(\Sigma My/nMs)^2+(\Sigma Mz/nMs)^2\}^{1/2}$$

In this case, Mx, My and Mz denote the dimension of magnetization respectively in a direction of track width, in a direction of the height and in a direction of the thickness, and "n" denotes the number of magnetization in the FGL 111. Further, maximum high-frequency field strength can be electromagnetically calculated based upon Ms_center, Ms_edge, S_center, S_edge, the thickness (17 nm) respectively of the FGL 11 and distance (10 nm) from the air bearing surface to an observation station of high-frequency field strength. As clear from FIG. 5, as S_edge/S_center grows larger, the SDR rapidly increases, and soon the SDR is saturated toward 1.

Figure 6:
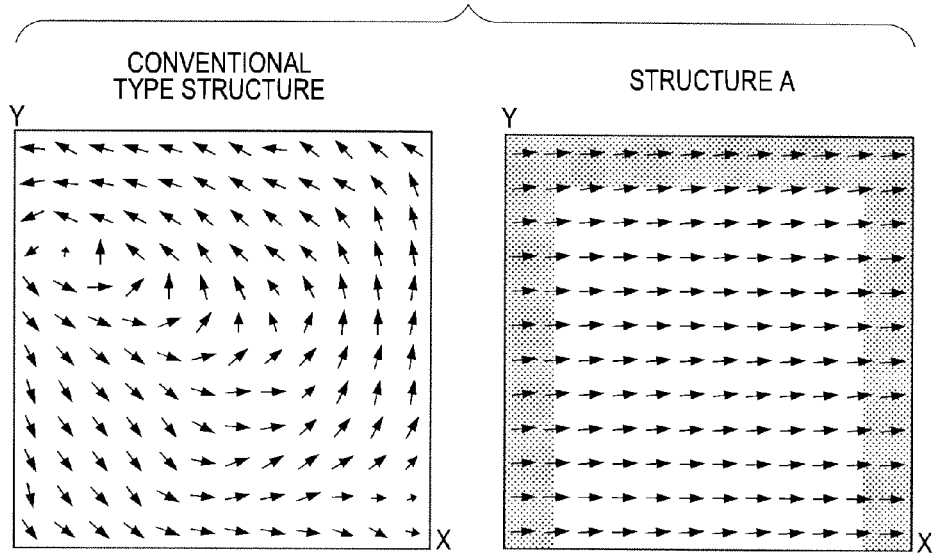
FIG. 6 shows each magnetized state in the film of the FGL 111 in a conventional type structure where S_edge/S_center is 0.55 and in a structure A according to the present invention where S_edge/S_center is 1.

FIG. 6 shows in-plane magnetized states of the film of the FGL 111 in the conventional type structure in which S_edge/S_center is 0.55 and in the structure A according to the present invention in which S_edge/S_center is 1. It can be verified that in the conventional type structure in which the SDR is 0.55, a direction of magnetization is not aligned in one direction particularly at the end of the film while in the structure A in which the SDR is 0.95, a direction of magnetization is almost aligned in the same direction. This effect is acquired by reducing the difference in a demagnetizing field between the end of the film and the center by increasing the area of FGL_edge where Ms is small. In the meantime, maximum high-frequency field strength gradually decreases because mean saturation magnetization of the whole FGL decreases. As described above, the dependence of the SDR and the maximum high-frequency field strength to S_edge/S_center shows that the SDR and the maximum high-frequency field strength are mutually in the relation of a trade-off. However, as actually acquired high-frequency field strength is equivalent to a product of a dimension of the saturation magnetization of the whole FGL and the SDR, S_edge/S_center in which the effect of greatly enhancing high-frequency field strength is acquired and a range of rates of area magnetization exist.

Figure 7:
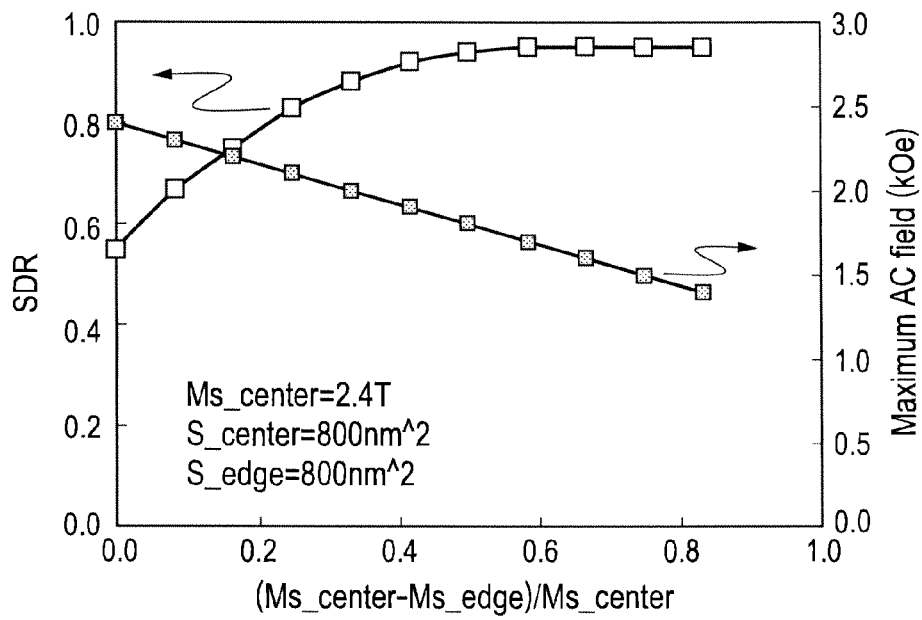
FIG. 7 shows the dependence of SDR and maximum high-frequency field strength when S_edge/S_center is set to 1, Ms_center is fixed to 2.4 T and Ms_edge is varied from 2.4 T to 0.0 T to (Ms_center−Ms_edge)/Ms_edge.

FIG. 7 shows the dependence of SDR and maximum high-frequency field strength when S_edge/S_center is fixed to 1, Ms_center is fixed to 2.4 T and Ms_edge is varied from 2.4 T to 0.0 T to (Ms_center−Ms_edge)/Ms_edge. As the difference in a demagnetizing field between FGL_edge and FGL_center decreases when (Ms_center−Ms_edge)/Ms_center is larger, the SDR grows larger. In the meantime, as the mean Ms of the whole FGL decreases when (Ms_center−Ms_edge)/Ms_center is larger, maximum high-frequency field strength decreases. (A mean value <Ms> of Ms=(Ms_center S_center+Ms_edge S_edge)/(S_center+S_edge)=Ms_center−(S_edge Ms_edge/(S_center+S_edge)) X, in this case, X=(Ms_center−Ms_edge)/Ms_center, and when X is made larger, <Ms> decreases.) The dependence of the SDR and the maximum high-frequency field strength to (Ms_center−Ms_edge)/Ms_center is similar to the dependence to (S_edge/S_center) shown in FIG. 5.

Figure 8:
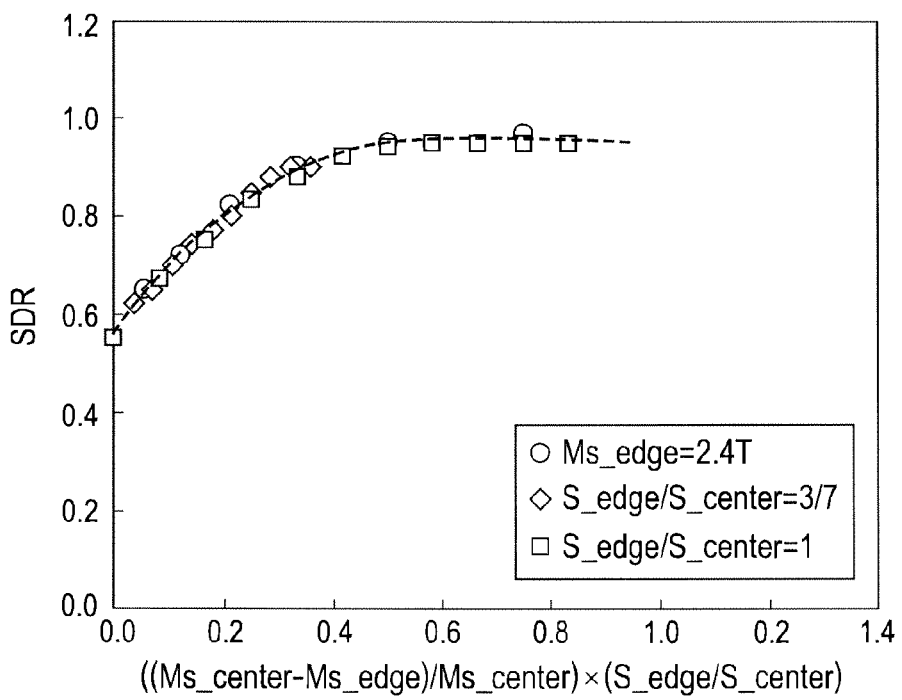
FIG. 8 shows the dependence of SDR when M_edge is fixed to 1.2 T, S_edge/S_center is varied and when S_edge/S_center is fixed to 1.0 or 3/7 and Ms_edge is varied from 2.4 T to 0.0 T to a rate of area magnetization.

FIG. 8 shows the dependence of the SDR when M_edge is fixed to 1.2 T and S_edge/S_center is varied and when S_edge/S_center is fixed to 1.0 or 3/7 and Ms_edge is varied from 2.4 T to 0.0 T to a rate of area magnetization. As clear from this result, the SDR is determined by only the rate of area magnetization both when S_edge/S_center is varied and when Ms_edge is varied. Accordingly, each optimum range of high-frequency field strength and SDR is determined by only a rate of area magnetization.

The range of rates of area magnetization according to the present invention defined in the expression (1) does not vary even if Ms_center and S_center are different. When Ms_center is different, an absolute value itself of a demagnetizing field varies. However, a problem in turning to a single domain is that the difference in a demagnetizing field between the end of the FGL 111 and the center is large for the demagnetizing field in the center. In the expression (1), as the difference between Ms_center and Ms_edge is normalized based upon Ms_center, the effective range of rates of area magnetization is unchanged regardless of a value of Ms_center.

Similarly, as the rate of area magnetization is also defined with the ratio of S_edge to S_center in the expression (1) when S_center is different, the effective range of rates of area magnetization is unchanged. However, when the area of FGL 111 is large up to approximately 200×200 nm² or more, single domain oscillation is difficult even if the structure according to the present invention is used because a dimension of magnetostatic energy that directs magnetization to be antiparallel grows larger, compared with switched connection energy that makes a direction of magnetization even. However, in an HDD utilizing a microwave assisted recording method, a device the area of FGL of which is equal to or larger than 200×200 nm² is not used from a viewpoint of recording density.

Figure 9:
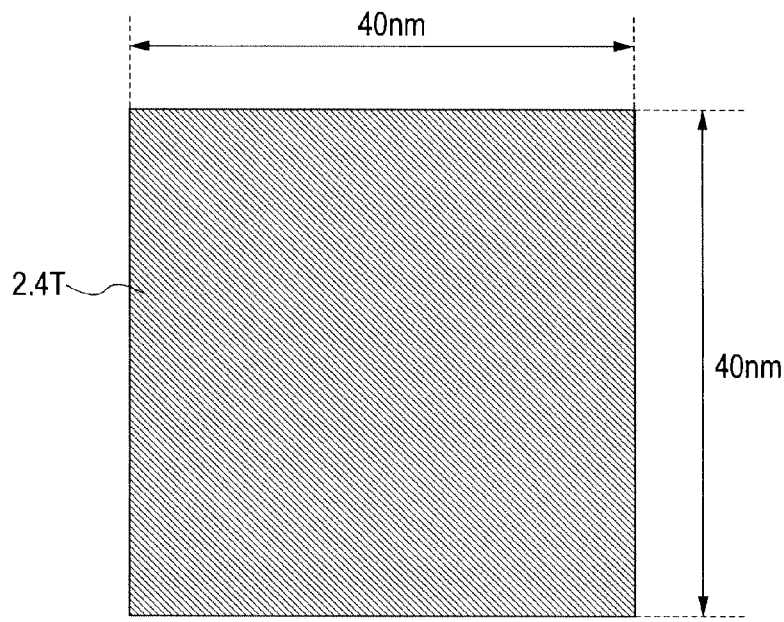
FIG. 9 shows an example of conventional type configuration where Ms is uniform.
Figure 10:
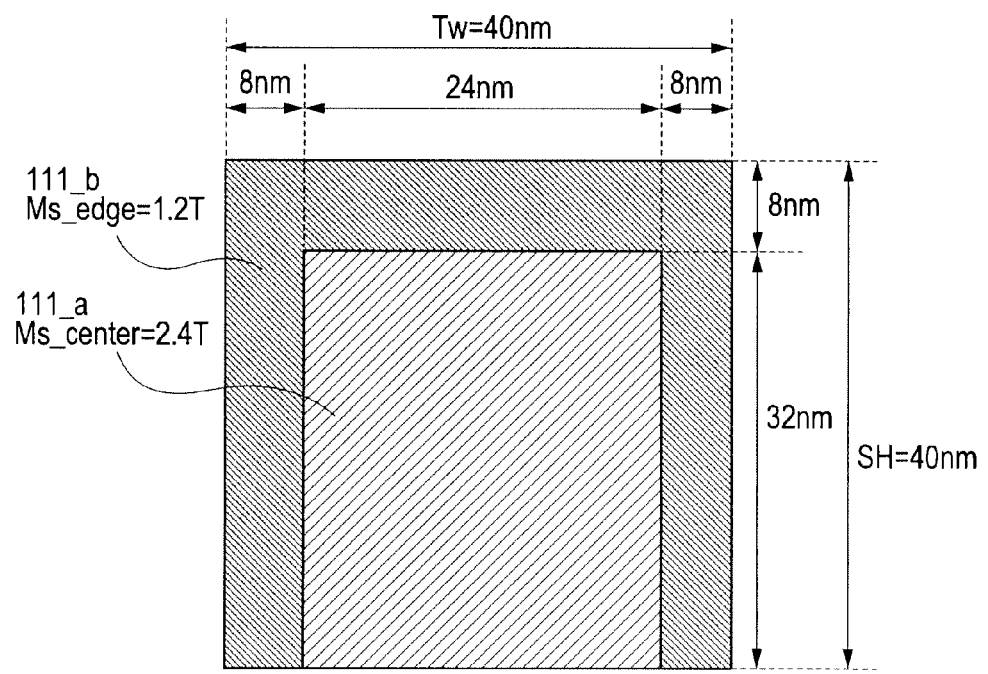
FIG. 10 shows an example of configuration where Ms_center is 2.4 T and Ms_edge is 1.2 T.
Figure 11:
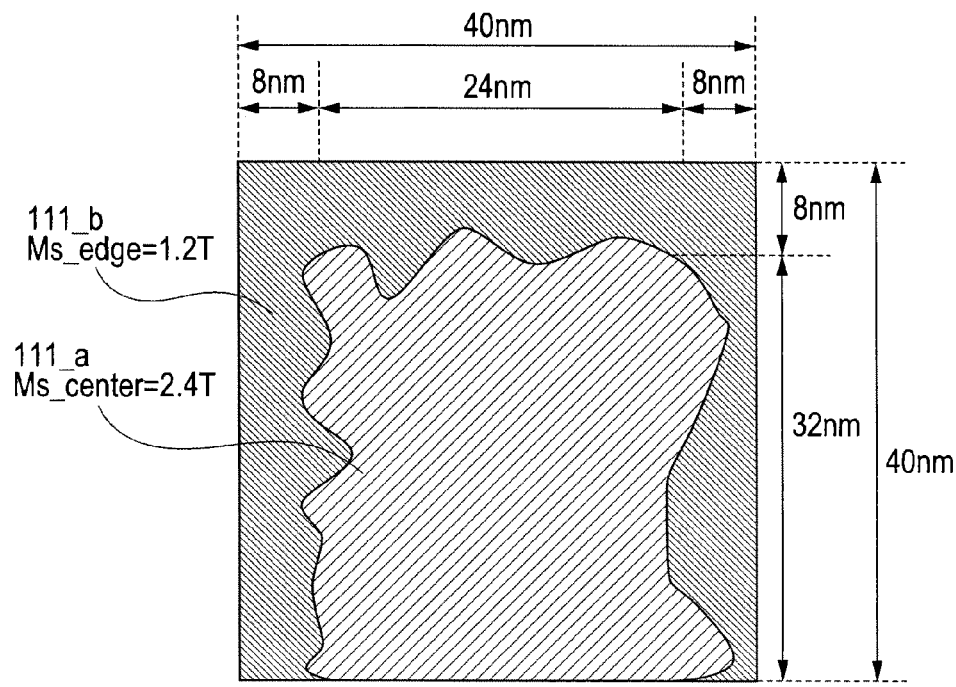
FIG. 11 shows an example of configuration where a boundary between FGL_center and FGL_edge is irregular.
Figures 16, 17:
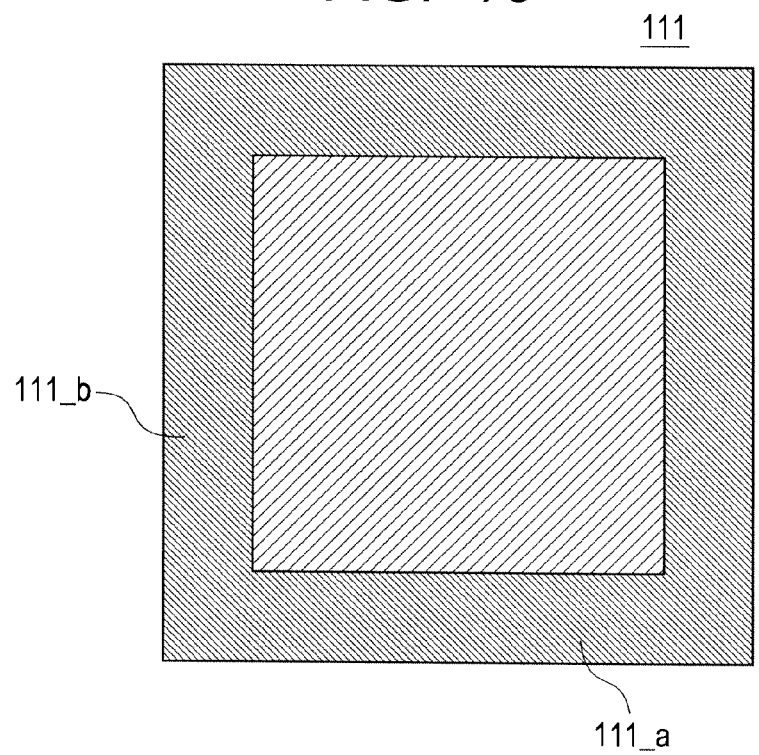
FIG. 16 shows an example of configuration of in a fifth embodiment.
FIG. 17 compares respective values in the conventional type configuration and the configuration according to the present invention.

FIGS. 9, 10, 11 and 12 show examples of configurations in which an optimum rate of area magnetization is acquired in the structure according to the present invention. A table shown in FIG. 17 shows a result of comparing respective values in a conventional type configuration and the configuration according to the present invention. FIG. 9 shows the example of the conventional type configuration in which Ms is uniform, SDR is 0.55, and high-frequency field strength is 1.3 kOe. In the example of this configuration shown in FIG. 10, Ms_center is 2.4 T and Ms_edge is 1.2 T. FGL_center in which the decrease of Ms is not caused is substantially in the shape of a rectangle. S_center and S_edge are both 800 nm². SDR grows 0.95 and high-frequency field strength is enhanced up to 1.7 kOe by making such configuration. FGL_center in this configuration is rectangular. However, as long as the ratio of the area of S_center to S_edge is in an unchanged range even if a boundary between FGL_center and FGL_edge is irregular as shown in FIG. 11, it does not affect the effect and its scope of the present invention.

Figure 12:
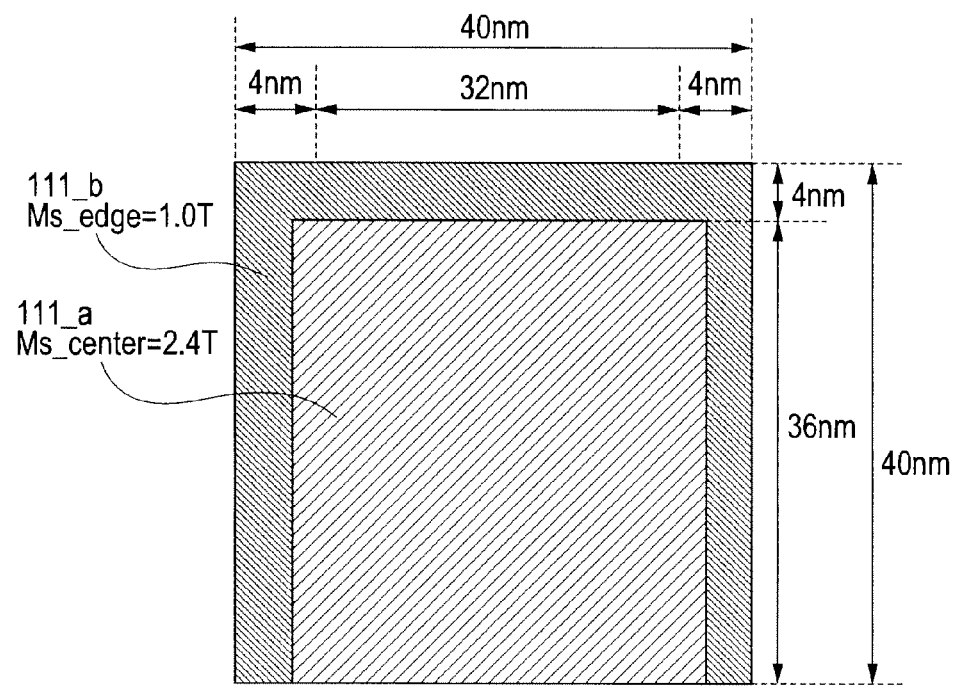
FIG. 12 shows an example of configuration where Ms_center is 2.4 T and Ms_edge is 1.0 T.

FIG. 12 shows an example of another configuration of the present invention. In the example, Ms_center is 2.4 T and Ms_edge is 1.0 T. S_center and S_edge are 1120 nm² and 480 nm². SDR is 0.85 and high-frequency field strength is 1.6 kOe owing to such configuration, and enhancement from the conventional type structure is enabled.

The difference in saturation magnetization between a center and an end of FGL 111 can be made by reducing saturation magnetization at the end of the FGL 111 by applying oxidation, nitriding and other processing for chemical reaction to the end of the FGL 111 or by injecting an ion such as nitrogen and chromium (Cr) into the end after the FGL 111 is made of the same magnetic material for example. Further, the end may also be formed by material different in saturation magnetization beforehand.

Second Embodiment

Figure 13:
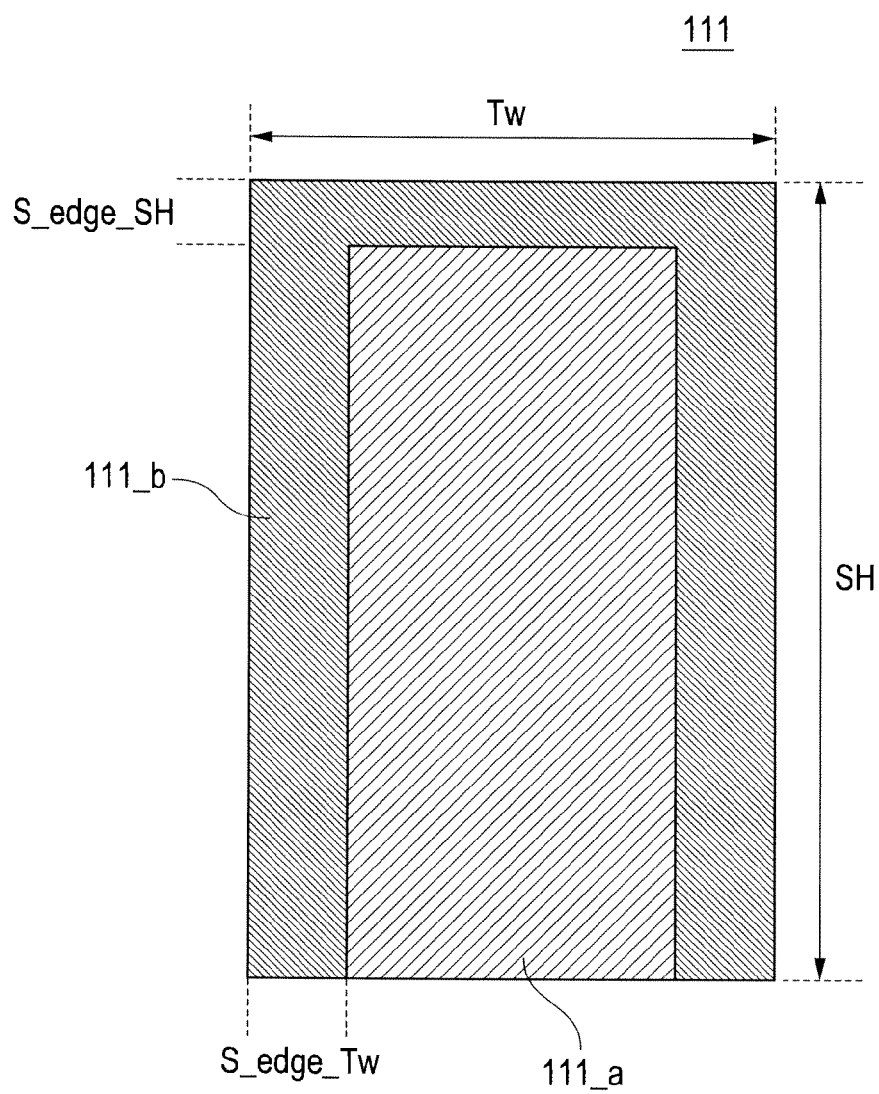
FIG. 13 shows an example of configuration in a second embodiment.

FIG. 13 shows a second embodiment of the present invention. In this embodiment, as in the first embodiment, FGL 111 is in the shape of a rectangle in which the height SH of the FGL 111 in a direction from an air bearing surface to a surface opposite to it is larger than the length Tw in a direction of track width. Since the distance between ends in the direction of track width of the FGL is shorter than an end in the direction of the height of the FGL when saturation magnetization is uniform in such a shape, a dimension of a demagnetizing field increases. Therefore, magnetization at the end of the FGL in the direction of track width cannot be spun as magnetization in another part and it is a main cause that inhibits single domain oscillation. Accordingly, in this shape, it is required to further reduce a dimension of a demagnetizing field at the end in the direction of track width of the FGL 111.

Then, as in this embodiment, when the saturation magnetization Ms of a region S_edge in which the quantity of magnetization is reduced at the end of the FGL 111 is the same in the region, a dimension of a demagnetizing field at the end of the FGL 111 in the direction of track width can be further reduced by increasing the region S_edge_Tw in which the quantity of magnetization is reduced in the direction of track width, compared with a region S_edge_SH in which the quantity of magnetization is reduced in the direction of the height of the FGL 111. Hereby, the difference between the dimension of the demagnetizing field at the end in the direction of track width of the FGL 111 and a dimension of a demagnetizing field in the center and at the end in the direction of the height of the FGL 111 decreases, and oscillation in a state in which the magnetization of the FGL 111 is synchronously spun, that is, in a state of a single domain, is facilitated.

Further, when a dimension of the region S_edge in which the quantity of magnetization is reduced in the direction of track width is equal to a dimension of the region S_edge in the direction of the height of the FGL, the similar effect is also acquired by more reducing saturation magnetization Ms at the end of the FGL 111 in the direction of track width than that at the end in the direction of the height of the FGL 111. In this case, the region S_edge in which the quantity of magnetization is reduced and the saturation magnetization Ms are not required to be independently controlled and even if both are simultaneously varied, the similar effect is acquired. In this case, as to the ratio (Ms/S_edge) of saturation magnetization Ms in a part 111_b in which the quantity of magnetization is reduced at the end of the FGL 111 to the region S_edge, since a dimension of a demagnetizing field at the end in the direction of track width is made equal to a dimension of a demagnetizing field at the end in the direction of the height of the FGL 111 by making the ratio of respective Ms/S_edge at the end in the direction of track width and at the end in the direction of the height of the FGL similar to the ratio of the height SH in the direction of the height of the FGL to the length Tw in the direction of track width, single domain oscillation is made the easiest to acquire, that is, large generated magnetic field strength can be acquired.

Third Embodiment

Figure 14:
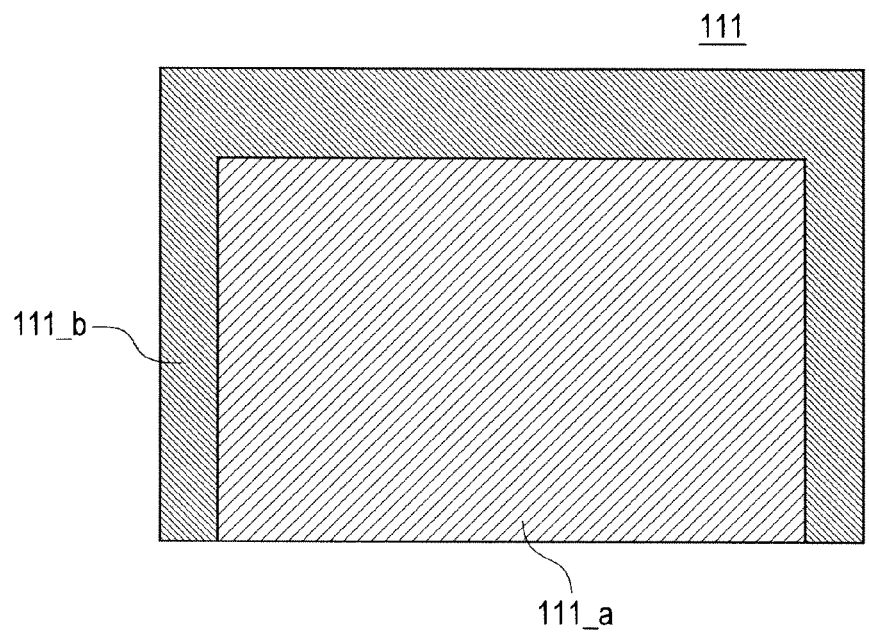
FIG. 14 shows an example of configuration in a third embodiment.

FIG. 14 shows a third embodiment of the present invention. FGL 111 in this embodiment is in the shape of a rectangle. Unlike the second embodiment, the length Tw in a direction of track width is larger than the height SH in a direction of the height of FGL 111. Accordingly, in this case, a dimension of a demagnetizing field at an end in the direction of the height of the FGL 111 is larger than that at an end in the direction of track width and it is a main cause that inhibits single domain oscillation. In this shape, the dimension of a demagnetizing field at the end of the FGL in the direction of the height can be further reduced by further enlarging a region S_edge in which the quantity of magnetization is reduced in a part 111_b in which the quantity of magnetization is reduced at the end of the FGL 111 in the direction of the height as described in the second embodiment or reducing saturation magnetization Ms and further, simultaneously controlling both. As a result, the difference between the dimension of a demagnetizing field at the end in the direction of the height of the FGL 111 and a dimension of a demagnetizing field in the center and at the end in the direction of track width decreases and single domain oscillation is facilitated as in the second embodiment.

Further, in this case, as in the second embodiment, as to the ratio (Ms/S_edge) of saturation magnetization Ms in the part 111_b in which the quantity of magnetization is reduced at the end of the FGL 111 to the region S_edge, since the dimension of a demagnetizing field at the end in the direction of track width is made equal to the dimension of a demagnetizing field at the end in the direction of the height of the FGL by making the ratio ((Ms_Tw/S_Tw)/(Ms_SH/S_SH)) of respective Ms/S_edge at the end in the direction of track width and at the end in the direction of the height of the FGL similar to the ratio (SH/Tw) of the height SH of the FGL to the length Tw in the direction of track width, single domain oscillation is made the easiest to acquire and sufficient generated magnetic field strength can be acquired.

Fourth Embodiment

Figure 15:
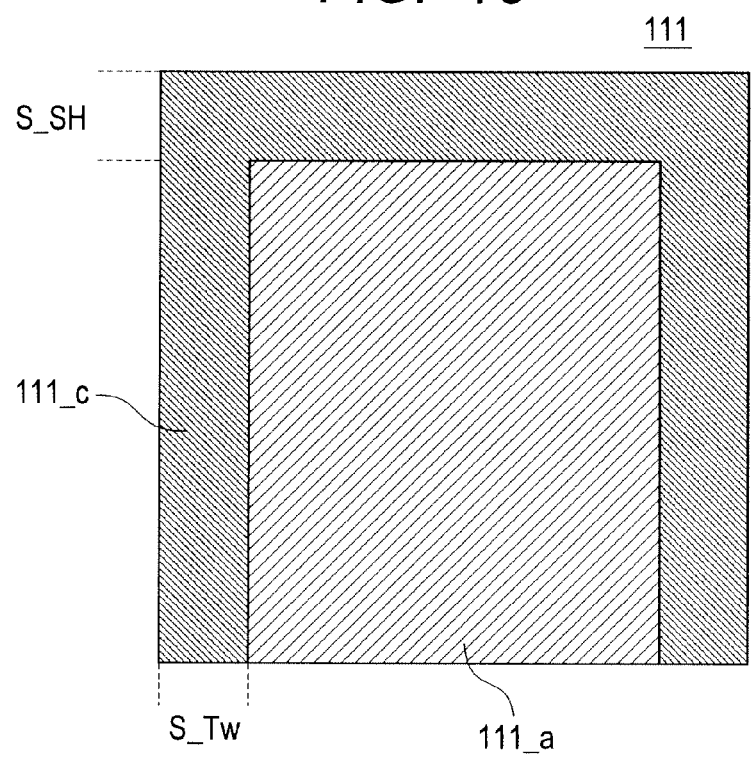
FIG. 15 shows an example of configuration in a fourth embodiment.

FIG. 15 shows a fourth embodiment of the present invention. This embodiment is based upon the structure of the FGL 111 in the first embodiment and in a structure 111_c in this embodiment, saturation magnetization Ms in a part in which the quantity of magnetization is reduced at an end of FGL 111 is acquired by reducing saturation magnetization in the center 111_a of the FGL gradually at two or more stages. In this case, since a dimension of a demagnetizing field at the end of the FGL is reduced according to mean saturation magnetization Ms of the part 111_c in which the quantity of magnetization is gradually reduced, single domain oscillation can be acquired owing to the effect of reducing the dimension of a demagnetizing field at the end of the FGL 111 as in the first embodiment.

Besides, in a shape of FGL 111 in which the height SH of the FGL and the length Tw in a direction of track width are different as in the second and third embodiments, as to the ratio (Ms/S_edge) of the mean saturation magnetization Ms of the part 111_c in which the quantity of magnetization is reduced at the end of the FGL 111 to a region S_edge, the similar effect can be acquired by making the ratio ((Ms_Tw/S_Tw)/(Ms_SH/S_SH)) of each Ms/S_edge at the end in the direction of track width and at the end in the direction of the height of the FGL 111 similar to the ratio (SH/Tw) of the height SH of the FGL 111 and the length Tw in the direction of track width.

The structure described in this embodiment in which the saturation magnetization at the end of the FGL 111 is gradually varied can be realized by applying the forming method described in the first embodiment.

Fifth Embodiment

FIG. 16 shows a fifth embodiment of the present invention. This embodiment relates to a structure where a part 111_b (saturation magnetization is fixed) or 111_c (saturation magnetization is gradually reduced) in which the quantity of magnetization is reduced also exists at an end in a direction from an air bearing surface of FGL 111 to a surface opposite to it, in addition to the part 111_*b* or 111_*c* in which the quantity of magnetization is reduced in the first to fourth embodiments. In this case, as the part 111_*b* or 111_*c* in which the quantity of magnetization is reduced exists at all ends of the FGL 111, a dimension of a demagnetizing field at all the ends can be reduced. Therefore, the structure in this embodiment is a structure where the single domain oscillation of the FGL 111 is easy to acquire.

As the saturation magnetization Ms at the end in the direction from the air bearing surface to the surface opposite to it is reduced in this structure or as a part 111_*a* in which saturation magnetization is high in the center of the FGL 111 is apart from the surface opposite to the air bearing surface, magnetic field strength generated from the FGL 111 decreases. However, large generated magnetic field strength can be acquired by the realization of single domain oscillation by reducing the area (distance from the end) of the part in which the quantity of magnetization is reduced at the end in the direction from the air bearing surface to the surface opposite to it than the area of the part in which the quantity of magnetization is reduced at the other ends or designing so that the saturation magnetization is smaller than that in the part in which quantity of magnetization is reduced at the other ends.

The present invention is not limited to the above-mentioned embodiments and various transformed examples are included. For example, the embodiments are examples described in detail to plainly explain the present invention and the present invention is not necessarily limited to the example provided with all the configurations described above.

What is claimed is:

1. A spin-torque oscillator used for microwave assisted recording, comprising:
    at least one fixed layer, one non-magnetic intermediate layer and one alternating-current magnetic field generation layer respectively,
    wherein saturation magnetization at ends of a film of the alternating-current magnetic field generation layer except an end in a direction from an air hearing surface to a surface opposite to it is smaller than saturation magnetization in the center of a film of the alternating-current magnetic field generation layer.

2. The spin-torque oscillator according to claim 1,
    wherein when saturation magnetization in a region in which saturation magnetization is reduced at the ends of the film of the alternating-current magnetic field generation layer and an area of the region are respectively Ms_edge and S_edge, and saturation magnetization in a region in which saturation magnetization is large in the center of the film and the area of the region are respectively Ms_center and S_center, ((Ms_center−Ms_edge)/Ms_center)×(S_edge/S_center) is equal to or larger than 0.05 and is equal to or smaller than 1.

3. The spin-torque oscillator according to claim 1,
    wherein in the alternating-current magnetic field generation layer, the height in the direction from the air bearing surface to the surface opposite to it of the spin-torque oscillator is larger than the width in a direction of track width; and
    a ratio ((Ms_Tw/S_Tw)/(Ms_SH/S_SH)) of a ratio (Ms_Tw/S_Tw) of saturation magnetization in a part in which saturation magnetization is reduced at an end in a direction that crosses a track of the alternating-current magnetic field generation layer to an area of the part to a ratio (Ms_SH/S_SH) of saturation magnetization in a part in which saturation magnetization is reduced at the end in the direction of the height of the oscillator to the area or the part is substantially equal to a ratio (SH/Tw) of the height of the alternating-current magnetic field generation layer to the length in the direction or track width.

4. The spin-torque oscillator according to claim 1,
    wherein in the alternating-current magnetic field generation layer, the height in the direction from the air hearing surface to the surface opposite to it of the spin-torque oscillator is shorter than the width in the direction of track width; and
    a ratio ((Ms_Tw/S_Tw)/(Ms_SH/S_SH)) of a ratio (Ms_Tw/S_Tw) or saturation magnetization in a part in which saturation magnetization is reduced at an end in a direction that crosses a track of the alternating-current magnetic field generation layer to an area of the part to a ratio (Ms_SH/S_SH) of saturation magnetization in apart in which saturation magnetization is reduced at the end in the direction of the height of the oscillator to the area of the part is substantially equal to a ratio (SH/Tw) of the height of the alternating-current magnetic field generation layer to the length in the direction of track width.

5. The spin-torque oscillator according to claim 1,
    wherein saturation magnetization at ends of the film except the end in the direction from the air bearing surface to the surface opposite to it of the alternating-current magnetic field generation layer is made gradually smaller from the center of the film of the alternating-current magnetic film generation layer to the end.

6. The spin-torque oscillator according to claim 1,
    wherein the center of the film of the alternating-current magnetic field generation layer and the part in which saturation magnetization is reduced at the end of the film are made of different magnetic materials of at least two types.

7. The spin-torque oscillator according to any of claim 1,
    wherein the part in which saturation magnetization is reduced at the end of the film of the alternating-current magnetic field generation layer is formed by chemical reaction such as oxidation and nitriding or ion implantation.

8. The spin-torque oscillator according to any of claim 1,
    wherein saturation magnetization at the end in the direction from the air bearing surface to the surface opposite to it of the alternating-current magnetic field generation layer is also smaller than saturation magnetization in the center of the film.

9. A magnetic recording/reproducing head that records data on a magnetic record medium by microwave assisted recording and reproduces data, comprising:
    a recording head part including an oscillator for generating a high-frequency field, a main pole for generating a recording head magnetic field and a coil for exciting a magnetic field at the main pole; and
    a reproducing head part,
    wherein the oscillator is provided with at least one fixed layer, one non-magnetic intermediate layer and one alternating-current magnetic field generation layer respectively; and
    saturation magnetization at ends of a film of the alternating-current magnetic field generation layer except an end in a direction from an air bearing surface to a surface opposite to it is smaller than saturation magnetization in the center of a film of the alternating-current magnetic field generation layer.

10. The magnetic recording/reproducing head according to claim 9,
wherein in the alternating-current magnetic field generation layer of the oscillator, when saturation magnetization in a region in which saturation magnetization is reduced at the ends of the film and an area of the region are respectively Ms_edge and S_edge, and saturation magnetization in a region in which saturation magnetization is large in the center of the film and the area of the region are respectively Ms_center and S_center, ((Ms_center−Ms_edge)/Ms_center)×(S_edge/S_center) is equal to or larger than 0.05 and is equal to or smaller than 1.

11. The magnetic recording/reproducing head according to claim 9,
wherein in the alternating-current magnetic field generation layer of the oscillator, the height from the air bearing surface to the opposite surface of the oscillator is larger than the width in a direction of track width; and
a ratio ((Ms_Tw/S_Tw)/(Ms_SH/S_SH)) of a ratio (Ms_Tw/S_Tw) of saturation magnetization in a part in which saturation magnetization is reduced at an end in a direction that crosses a track of the alternating-current magnetic field generation layer to an area of the part to a ratio (Ms_SH/S_SH) of saturation magnetization in a part in which saturation magnetization is reduced at the end in the direction of the height of the oscillator to the area of the part is substantially equal to a ratio (SH/Tw) of the height of the alternating-current magnetic field generation layer to the length in the direction of track width.

12. The magnetic recording/reproducing head according to claim 9,
wherein in the alternating-current magnetic field generation layer of the oscillator, the height in the direction from the air bearing surface to the surface opposite to it of the oscillator is shorter than the width in a direction of track width; and
a ratio ((Ms_Tw/S_Tw)/(Ms_SH/S_SH)) of a ratio (Ms_Tw/S_Tw) of saturation magnetization in a part in which saturation magnetization is reduced at an end in a direction that crosses a track of the alternating-current magnetic field generation layer to an area of the part to a ratio (Ms_SH/S_SH) of saturation magnetization in a part in which saturation magnetization is reduced at the end in the direction of the height of the oscillator to the area of the part is substantially equal to a ratio (SH/Tw) of the height of the alternating-current magnetic field generation layer to the length in the direction of track width.

13. The magnetic recording/reproducing head according to any of claim 9,
wherein in the oscillator, saturation magnetization at ends of the film except the end in the direction from the air bearing surface to the surface opposite to it of the alternating-current magnetic field generation layer is made gradually smaller from the center of the film of the alternating-current magnetic field generation layer to the end.

14. The magnetic recording/reproducing head according to any of claim 9,
wherein in the oscillator, the center of the film of the alternating-current magnetic field generation layer and the part in which saturation magnetization is reduced at the end of the film are made of different magnetic materials of at least two types.

15. The magnetic recording/reproducing head according to any of claim 9,
wherein in the oscillator, the part in which saturation magnetization is reduced at the end of the film of the alternating-current magnetic field generation layer is formed by chemical reaction such as oxidation and nitriding or ion implantation.

16. The magnetic recording/reproducing head according to any of claim 9,
wherein in the oscillator, saturation magnetization at the end in the direction from the air hearing surface to the surface opposite to it of the alternating-current magnetic field generation layer is also smaller than saturation magnetization in the center of the film.

17. A disk unit including a magnetic record medium and a magnetic recording/reproducing head that records data on the magnetic record medium by microwave assisted recording and reproduces data,
wherein the magnetic recording/reproducing head is provided with a recording head part including an oscillator for generating a high-frequency field, a main pole for generating a recording head magnetic field and a coil for exciting a magnetic field at the main pole and a reproducing head part;
the oscillator is provided with at least one fixed layer, one non-magnetic intermediate layer and one alternating-current magnetic field generation layer respectively; and
saturation magnetization at ends of a film of the alternating-current magnetic field generation layer except an end in a direction from an air bearing surface to a surface opposite to it is smaller than saturation magnetization in the center of a film of the alternating-current magnetic field generation layer.

* * * * *